US010717902B2

(12) United States Patent
Burmeister

(10) Patent No.: US 10,717,902 B2
(45) Date of Patent: Jul. 21, 2020

(54) CONTROL WATER BASED ADHESIVE

(71) Applicant: SteriPax, Inc., Huntington Beach, CA (US)

(72) Inventor: Edward W. Burmeister, Pace, FL (US)

(73) Assignee: SteriPax, Inc., Huntington Beach, CA (US)

( * ) Notice: Subject to any disclaimer, the term of this patent is extended or adjusted under 35 U.S.C. 154(b) by 140 days.

(21) Appl. No.: 15/907,990

(22) Filed: Feb. 28, 2018

(65) Prior Publication Data
US 2018/0208802 A1 Jul. 26, 2018

Related U.S. Application Data

(62) Division of application No. 13/767,555, filed on Feb. 14, 2013, now abandoned.

(60) Provisional application No. 61/598,539, filed on Feb. 14, 2012.

(51) Int. Cl.
*C09J 9/00* (2006.01)
*B31B 70/62* (2017.01)
*B31B 155/00* (2017.01)
*B31B 170/20* (2017.01)

(52) U.S. Cl.
CPC .......... *C09J 9/00* (2013.01); *B31B 70/62* (2017.08); *B31B 2155/00* (2017.08); *B31B 2170/20* (2017.08); *Y10T 428/1352* (2015.01); *Y10T 428/1379* (2015.01); *Y10T 428/1386* (2015.01)

(58) Field of Classification Search
USPC ........................................................ 156/277
See application file for complete search history.

(56) References Cited

U.S. PATENT DOCUMENTS

| | | | | | |
|---|---|---|---|---|---|
| 2,098,258 | A | * | 11/1937 | Rowe | B65D 33/30 383/52 |
| 2,113,927 | A | * | 4/1938 | Alfred | B65D 5/0227 229/246 |
| 2,446,422 | A | * | 8/1948 | Jensen | B65D 3/10 229/5.5 |
| 2,500,549 | A | * | 3/1950 | Ketay | B65D 77/2024 242/160.1 |
| 2,649,239 | A | * | 8/1953 | Ellsworth | B65D 5/6661 229/102 |
| 2,651,450 | A | * | 9/1953 | Ellsworth | B65D 5/6661 229/212 |
| 2,737,336 | A | * | 3/1956 | Moore | B65D 5/563 229/125.35 |
| 2,950,590 | A | * | 8/1960 | O'Brien | B65B 7/285 53/342 |
| 3,151,800 | A | * | 10/1964 | Griese, Jr. | B65D 77/2056 220/257.2 |
| 3,488,472 | A | * | 1/1970 | Pizarro | B29C 66/8414 219/243 |
| 3,520,439 | A | * | 7/1970 | Smith | B65D 1/30 220/23.4 |
| 3,788,876 | A | | 1/1974 | Baker et al. | |
| 3,890,767 | A | * | 6/1975 | Cawrse | B65B 7/2807 53/296 |
| 3,971,188 | A | * | 7/1976 | Cawrse | B65B 7/2807 53/478 |
| 4,047,473 | A | * | 9/1977 | Fletcher | B21D 51/46 493/108 |
| 4,206,844 | A | | 6/1980 | Thukamoto et al. | |
| 4,211,338 | A | * | 7/1980 | Bublitz | B65D 77/2024 220/359.1 |
| 4,456,164 | A | * | 6/1984 | Foster | B65D 77/2032 229/125.35 |
| 4,493,860 | A | * | 1/1985 | Callahan | B05C 7/00 118/408 |
| 5,653,090 | A | | 8/1997 | Weiss et al. | |
| 5,725,820 | A | * | 3/1998 | Reynolds | B29C 31/044 264/135 |
| 6,059,112 | A | * | 5/2000 | Dykstra | A61L 2/26 206/438 |
| 6,063,838 | A | * | 5/2000 | Patnode | C09J 9/00 523/172 |
| 6,098,800 | A | * | 8/2000 | Bennish, Jr. | A61L 2/26 206/438 |
| 6,207,227 | B1 | | 3/2001 | Russo et al. | |
| 6,303,700 | B1 | | 10/2001 | Chen | |
| 6,383,586 | B1 | | 5/2002 | Langeland | |
| 6,572,004 | B2 | * | 6/2003 | Siu | H05K 3/301 174/539 |
| 7,544,385 | B2 | * | 6/2009 | Hansel | B05B 5/1616 118/101 |
| 7,718,433 | B2 | | 5/2010 | Stecklein et al. | |
| 8,758,807 | B2 | | 6/2014 | Lam et al. | |
| 2002/0036224 | A1 | * | 3/2002 | Siu | H05K 3/301 228/110.1 |

(Continued)

FOREIGN PATENT DOCUMENTS

WO 1999039989 A1 8/1999
WO 1999065998 A1 12/1999

(Continued)

OTHER PUBLICATIONS

International Search Report and Written Opinion from Australian Patent Office for PCT/US2013/026190 dated Feb. 14, 2013, 17 pp.

*Primary Examiner* — Sing P Chan
(74) *Attorney, Agent, or Firm* — Edwin S. Flores; Chalker Flores, LLP

(57) ABSTRACT

The present invention includes compositions of matter, methods of making and using a sealable container using a design control water based adhesive composition for application using a printing press by providing a substrate comprising a first side and a second side each having a top edge, a bottom edge, a right edge, a left edge and a storage region positioned there between; applying a first composition to the top edge, the bottom edge, the right edge, the left edge; applying at least a second composition to the first composition; and placing a cover on the at least a second composition to be sealed by the second composition and the first composition.

4 Claims, No Drawings

(56) References Cited

U.S. PATENT DOCUMENTS

| | | | |
|---|---|---|---|
| 2003/0060786 A1 | 3/2003 | Olsen et al. | |
| 2004/0140240 A1* | 7/2004 | Ricotti | B65B 43/50 206/525 |
| 2006/0113307 A1* | 6/2006 | Goulette | A45C 11/20 220/495.06 |
| 2006/0263517 A1* | 11/2006 | Hansel | B05B 5/1616 427/208.2 |
| 2008/0102232 A1 | 5/2008 | Story | |
| 2009/0283438 A1* | 11/2009 | Bourque | A61J 1/03 206/531 |
| 2013/0206630 A1* | 8/2013 | Burmeister | C09J 9/00 206/459.1 |
| 2018/0208802 A1* | 7/2018 | Burmeister | C09J 9/00 |
| 2020/0010256 A1* | 1/2020 | Larsson | B65D 51/1644 |

FOREIGN PATENT DOCUMENTS

| | | |
|---|---|---|
| WO | 2007117999 A2 | 10/2007 |
| WO | 2007124281 A2 | 11/2007 |
| WO | 2010059472 A1 | 5/2010 |
| WO | 2011140469 A1 | 11/2011 |
| WO | 2013123230 A1 | 8/2013 |

\* cited by examiner

CONTROL WATER BASED ADHESIVE

CROSS-REFERENCE TO RELATED APPLICATIONS

This patent application is a divisional patent application of U.S. patent application Ser. No. 13/767,555 filed on Feb. 14, 2013 and entitled "Design Control Water Based Adhesive," which claims priority to U.S. Provisional Application Ser. No. 61/598,539 filed Feb. 14, 2012, the entire contents of which are incorporated herein by reference.

INCORPORATION-BY-REFERENCE OF MATERIALS FILED ON COMPACT DISC

None.

TECHNICAL FIELD OF THE INVENTION

The present invention relates in general to the field of adhesive compositions, specifically to compositions of matter and methods of making and using adhesive compositions for packaging a sterilizable article for presentation onto a sterile field.

STATEMENT OF FEDERALLY FUNDED RESEARCH

None.

BACKGROUND OF THE INVENTION

Without limiting the scope of the invention, its background is described in connection with coating of an adhesive, applied and pressure sealed, to form an airtight seal to maintain sterility. Various medical instruments, medical devices, tools, and supplies are subjected to sterilization treatments and packaged sterilely. In the context of packaging, it is particularly important that sterile technique be practiced during sealing and during opening of a package. One important feature of the packaging material is to have good drapeability such that it will readily fall away from a sterilized item as the sterilized package is opened. Another important feature is the sealing of the package to maintain sterility. Often a single coating of adhesive is applied and pressure sealed, in theory, to form an airtight seal in order to maintain sterility; however, in actuality the single coating is susceptible to non-uniform coating and leakage.

For example, U.S. Patent Application Publication No. 2008/0102232, entitled, "Synthetic Based Self Seal Adhesive System for Packaging," includes a water based self seal adhesive system utilizing a self seal adhesive containing no natural rubber. The self seal adhesive system is a transfer adhesive disposed on a transfer web and an anchor adhesive disposed on an anchor web with the two adhesives forming the seal for the package. The self seal adhesives bond to themselves when pressure is applied to close or seal the packaging material. When peeled apart, the adhesive splits, adhesive fails from either or both the front web and the back web, or destroys one or both of the substrates of the package. Primer coatings may also be used to enhance performance of the self seal adhesive.

For example, U.S. Pat. No. 5,653,090, entitled, "Sterilizable Flexible Pouch Package," includes a high temperature steam-sterilizable flexible pouch package includes a non-woven barrier web, a perforated plastic intermediate web, and an imperforate plastic upper web. Line heat seals bonding the webs form a cavity into which high temperature sterilizing steam may enter after passing through the barrier and intermediate webs. The line heat seal bonding the upper and intermediate webs is of the delamination failure type. An access opening is provided for insertion of an object to be sterilized into the cavity after which the access opening is sealed, enclosing the object in the cavity. After high temperature steam sterilizing, the package is opened by peeling apart the upper web from the intermediate web which causes a delamination failure of the line heat seal.

For example, U.S. Pat. No. 7,718,433, entitled, "Packaging System for a Sterilized Article," includes a sterilization pouch. The pouch includes a posterior portion attached to an anterior portion along three edges. The two portions define the pouch. The top part of the pouch is inverted so that the inside part of the pouch is facing outward and forms a cuff around the pouch. An integral internal sterilization indicator is further provided. The integral indicator comprises a sterilizing agent sensitive substance. The sterilizing agent sensitive substance can be an indicator ink printed as an ink line on the interior of the sterilization pouch below the cuff.

For example, U.S. Pat. No. 6,059,112, entitled, "Peel Package," includes a sterilizable package for medical objects or the like, comprising, a first layer of material, a second layer of film on said first layer, a third layer having a preformed blister formed from film on said second layer, the layers being sealed together in a peripheral seal to form a space between the second and third layers for an object, the seal between the first layer and the second and third layers being releasable by tensile separation of the first layer from the second and third layers, and the second layer having a breakable perforation line at the space whereby the second layer can be broken at the perforation line to expose a portion of the object for direct presentation of the object from one person to another person.

For example, U.S. Pat. No. 6,383,586, entitled, "Formulation," includes an adhesive composition that is specifically formulated for use in packaging medical products such as catheters between a spun-bonded polyolefin non-woven fabric and an ethylene vinyl acetate copolymer film includes from about 5 to about 65 percent by weight of a low density polyethylene; from about 35 to about 90 percent by weight of an ethylene vinyl acetate copolymers; and from about 5 to about 65 percent by weight of a linear block copolymer having at least one vinyl substituted aromatic hydrocarbon polymer block and at least one polyolefin polymer block made from an aliphatic conjugated diene.

For example, U.S. Pat. No. 6,063,838, entitled, "Blended Pressure-Sensitive Adhesives," includes a pressure-sensitive adhesive comprising a blend of at least two components, wherein the first component is at least one pressure-sensitive adhesive and the second component is at least one thermoplastic material, wherein the components form a blended composition having more than one domain and, wherein one domain is substantially continuous (generally, the pressure-sensitive adhesive) and the other domain is substantially fibrillous to schistose (generally, the thermoplastic material). The second component can be (a) at least one thermoplastic elastomer, (b) at least one elastomer with a tackifying resin or (c) at least one elastomer. The entire contents of each of which are incorporated herein by reference.

BRIEF SUMMARY OF THE INVENTION

The present invention provides a design control water based adhesive composition for application using a printing press comprising: a design control water based adhesive composition comprising one or more selected from acrylonitrile butadiene, polyamide, polybutadiene, ethylene vinyl acetate, polypropylene, polybutylene, acrylic, natural rubber, neoprene, polycholoroprene, polyester, polyester emulsion, polyisoprene, polypropylene emulsion, polyurethane, polyvinyl acetate, polyvinyl alcohol, polyvinyl butyral, polyvinyl chloride, polyvinylidene chloride, silicone emulsion, styrene isoprene, styrene acronitrile, styrene acrylic, styrene butadiene, vinyl acetate, vinyl acetate-ethylene, vinyl alcohol, and wax emulsion.

In one embodiment the design control water based adhesive further includes one or more additives selected from the group consisting of tackifiers, fillers, plasticizers, property modifiers, flow modifiers, dyes, pigments, flame retardants, stabilizers, antioxidants, compatibilizers, antimicrobial agents, pH adjusters, deionized water, colorants, sequestrants, preservatives, surfactants and other additives.

The present invention also includes a package for containing an article including a flexible anchor web; a flexible transfer web; and a design control water based adhesive composition comprising one or more selected from acrylonitrile butadiene, polyamide, polybutadiene, ethylene vinyl acetate, polypropylene, polybutylene, acrylic, natural rubber, neoprene, polycholoroprene, polyester, polyester emulsion, polyisoprene, polypropylene emulsion, polyurethane, polyvinyl acetate, polyvinyl alcohol, polyvinyl butyral, polyvinyl chloride, polyvinylidene chloride, silicone emulsion, styrene isoprene, styrene acronitrile, styrene acrylic, styrene butadiene, vinyl acetate, vinyl acetate-ethylene, vinyl alcohol, and wax emulsion coated on a surface of either or both of said anchor and transfer webs.

The polymer emulsion may contains a polymer or copolymer selected from the group consisting of carboxylated vinyl acetate ethylene emulsion, styrene acrylate emulsion and acrylates, styrene acrylates, vinyl acetates, vinyl acetate ethylene copolymers, ethylene vinyl acetate copolymers, (high styrene) styrene butadiene rubbers, polyurethane dispersions, polystyrene emulsions, vinyl chloride ethylene emulsions, polyvinyl chloride homopolymers and copolymers emulsions, polyvinylidene chloride homopolymers and copolymer emulsions, polyethylene homopolymer and copolymer emulsions, polypropylene homopolymer and copolymer emulsions, and polyester emulsions, acrylonitrile butadiene, polyamide, polybutadiene, ethylene vinyl acetate, polypropylene, polybutylene, acrylic, natural rubber, neoprene, polycholoroprene, polyester, polyester emulsion, polyisoprene, polypropylene emulsion, polyurethane, polyvinyl acetate, polyvinyl alcohol, polyvinyl butyral, polyvinyl chloride, polyvinylidene chloride, silicone emulsion, styrene isoprene, styrene acronitrile, styrene acrylic, styrene butadiene, vinyl acetate, vinyl acetate-ethylene, vinyl alcohol, wax emulsion and/or mixtures thereof.

The design control water based adhesive composition may include about 1 to 99.9% of a polymer or combination of polymers, selected from the group consisting of: styrene butadiene rubber (SBR), acrylic polymers and copolymers, ethylene vinyl acetate (EVA), ethylene methacrylic (EMA) or acrylic acid (EAA), polyethyleneimine (PEI), polyurethane (PU), silanes and silanated polymers.

In one embodiment, the present invention includes a packaging printing press method for a sealable container including a sealable container comprising a first side and a second side each having a top side, a bottom side, a right side, a left side and a storage region positioned there between; one or more adhesive layers deposited on the sealable substrate the top side, the bottom side, the right side, the left side of the first side; and a cover positioned to fit the sealable substrate. The present invention may include an integral sterilization indicator. The one or more adhesive layers may include a polymer or copolymer selected from the group consisting of: carboxylated vinyl acetate ethylene emulsion, styrene acrylate emulsion and acrylates, styrene acrylates, vinyl acetates, vinyl acetate ethylene copolymers, ethylene vinyl acetate copolymers, (high styrene) styrene butadiene rubbers, polyurethane dispersions, polystyrene emulsions, vinyl chloride ethylene emulsions, polyvinyl chloride homopolymers and copolymers emulsions, polyvinylidene chloride homopolymers and copolymer emulsions, polyethylene homopolymer and copolymer emulsions, polypropylene homopolymer and copolymer emulsions, and polyester emulsions, acrylonitrile butadiene, polyamide, polybutadiene, ethylene vinyl acetate, polypropylene, polybutylene, acrylic, natural rubber, neoprene, polycholoroprene, polyester, polyester emulsion, polyisoprene, polypropylene emulsion, polyurethane, polyvinyl acetate, polyvinyl alcohol, polyvinyl butyral, polyvinyl chloride, polyvinylidene chloride, silicone emulsion, styrene isoprene, styrene acronitrile, styrene acrylic, styrene butadiene, vinyl acetate, vinyl acetate-ethylene, vinyl alcohol, wax emulsion and/or mixtures thereof.

The present invention provides a packaging method for a sealable container using a design control water based adhesive composition for application using a printing press by providing a printing press having multiple heads; providing the multiple heads individually with at least a first composition and a second composition; providing a substrate comprising a first side and a second side each having a top edge, a bottom edge, a right edge, a left edge and a storage region positioned there between; applying the first composition from the printing press to the top edge, the bottom edge, the right edge, the left edge; applying at least the second composition from the printing press to the first composition; and placing a cover on the at least a second composition to be sealed by the second composition and the first composition. The second composition and the first composition may include a polymer or copolymer selected from the group consisting of: a design control water based adhesive composition comprising one or more selected from acrylonitrile butadiene, polyamide, polybutadiene, ethylene vinyl acetate, polypropylene, polybutylene, acrylic, natural rubber, neoprene, polycholoroprene, polyester, polyester emulsion, polyisoprene, polypropylene emulsion, polyurethane, polyvinyl acetate, polyvinyl alcohol, polyvinyl butyral, polyvinyl chloride, polyvinylidene chloride, silicone emulsion, styrene isoprene, styrene acronitrile, styrene acrylic, styrene butadiene, vinyl acetate, vinyl acetate-ethylene, vinyl alcohol, and wax emulsion.

BRIEF DESCRIPTION OF THE SEVERAL VIEWS OF THE DRAWINGS

None.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Often a single coating of adhesive is applied and pressure sealed to in theory form an airtight seal to maintain sterility; however, in actually the single coating is susceptible to non-uniform coating and leakage.

As used herein the term "delamination failure peel seal" denotes a peelable seal which opens prematurely.

As used herein the term "permanent line heat seal" denotes a bonding two materials. The seal extends along a line and has a bonding strength that is greater than either of the bonded materials. An attempt to separate the bonded webs along the seal will result in destruction of the seal.

As used herein the term "laminated" denotes a multi-layer structure in which adjacent layers are bonded over essentially their entire adjacent surfaces, and is used broadly to encompass co-extrusions, true laminations of pre-formed sheets bonded to one another either with or without adhesives, and coated layers.

As used herein the term "barrier" denotes a material that is an effective barrier against the passage of contaminates.

The present invention provides a design control water based adhesive applied to TYVEK®, paper or film using printing press. The adhesive may be applied to the substrate in a pattern, a design, around the peripheral, or over the entire substrate. In one embodiment, the printing press coated 100% of the TYVEK® substrate. In another embodiment, the printing press coated the TYVEK® substrate in a pattern.

The present invention provides a system for the preparation of header bags, pouches, lids for soft (flexible packaging), hard trays and containers for the medical packaging industry. The coated material could be produced at roll goods or individual lids, depending upon the desired end use. The pouches could be film to film, paper to paper, paper to film, film to TYVEK®, TYVEK® to TYVEK®, or any other configuration used in medical packaging. The hard trays would require "lids" which would have the adhesive applied only in the areas where the seal is required.

The present invention provides a one, two, three, four, five or more adhesive system, and may be water based. In one embodiment, the present invention provides a three adhesive system on a TYVEK® substrate. The first adhesive is a mixture of SANCURE® 1601 a water based urethane system and HS-100 (Michelman) a water based Ethylene-vinyl acetate copolymer (EVA). This layer also applies strength to the TYVEK®, by soaking in and reinforcing the TYVEK® layers, so that the TYVEK® has less of a tendency to delaminate. The mixture may be 66%/34%, but can be 10-90% urethane and 10-90% EVA. The second adhesive is a material from Michelman, MED-777T, which is an EVA, which contains titanium dioxide to give a white appearance to the adhesive that remains on the film so that it can be seen if there is a compromise of the sterile seal. The third adhesive is also a material from Michelman, MED-777, which is the same as the second adhesive layer, except that it does not contain titanium dioxide. The D777 is a blend of EVA latexes.

The layers can also include a third layer that is a "softer" system. The viscosity of the adhesive systems is adjusted so that they are capable of being used on the particular printing press. In one embodiment the substrate is medical grade TYVEK®; however, other possible substrates will be discussed in the future system. The present invention also provides a system that can use flexography, gravure, screen, digital printing, embossing, letterpress, offset lithography, and thermography.

In another embodiment, the system includes an eight color Mark Andy printing press. In all cases, the anilox sizes are chosen to deliver the desired amount of ink, adhesive or both. For example, the first printing head applies ink in a pattern for identification purposes, on the side which will be opposite of the side with the patterned adhesive. The second and the third head apply the first layer of adhesive. The fourth and fifth head apply the second layer of adhesive. The sixth and seventh heads apply the third layer of adhesive. The adhesive or ink is dried by the heating system on the press, between each of the individual printing heads. The adhesive is printed on in whatever the desired pattern is for the finished product. The finished material is heat sealed to make pouches or header bags to a film.

The present invention provides numerous advantages including the fact that the adhesive does not come into contact with the packaged medical device, eliminating the possibility of adhesive transfer to the device. The present invention provides a reduction of the amount of breathable TYVEK® it needs to obtain the needed sterilization. The present invention provides a reduction of the time of sterilization, since a faster transfer of gas through the more breathable TYVEK®.

The present invention provides a system can be used for the desiccant industry, the toner lid industry (e.g., for systems using dry or wet toner) and the food packaging industry. These uses would be similar, with the application being done of a heat seal adhesive to the required areas for heat sealing and then used by applying heat and pressure for a specific period of time.

The substrates may be TYVEK®, a film, a modified paper, or paper for the medical packaging industry. For desiccant pouching the substrate can be TYVEK®, a paper, a modified paper, or a film. For the toner industry, the substrate can be a paper, a modified paper, a film or TYVEK®.

In addition to the present ingredients, the following could be used (they could be solvent or water based latexes): acrylonitrile butadiene, polyamide, polybutadiene, ethylene vinyl acetate, polypropylene, polybutylene, acrylic, natural rubber, neoprene, polycholoroprene, polyester, polyester emulsion, polyisoprene, polypropylene emulsion, polyurethane, polyvinyl acetate, polyvinyl alcohol, polyvinyl butyral, polyvinyl chloride, polyvinylidene chloride, silicone emulsion, styrene isoprene, styrene acronitrile, styrene acrylic, styrene butadiene, vinyl acetate, vinyl acetate-ethylene, vinyl alcohol, wax emulsion. They could be used straight or in blends.

In another embodiment, the system includes a multi-head printing press, wherein the anilox sizes are chosen to deliver the desired amount of ink, adhesive or both. For example, in a simple system having multiple print heads but using 2 print heads, the first printing head applies a first layer of a first adhesive and the second printing head applies a second layer of a second adhesive.

Another example includes a simple system having multiple print heads but using 5 print heads, the first printing head applies a first layer of a first adhesive; the second printing head applies a second layer of a second adhesive; the third printing head applies the third layer of a third adhesive; the fourth printing head applies a fourth layer of a fourth adhesive; and the fifth printing head applies a fifth layer of a fifth adhesive.

Another example includes a simple system having multiple print heads but using 10 print heads, the first printing head applies a first layer of a first adhesive; the second printing head applies a second layer of a second adhesive; the third printing head applies the third layer of a third adhesive; the fourth printing head applies a fourth layer of a fourth adhesive; the fifth printing head applies a fifth layer of a fifth adhesive; the sixth printing head applies a sixth layer of a sixth adhesive; the seventh printing head applies a seventh layer of a seventh adhesive; the eight printing head applies a eight layer of a eight adhesive; the ninth printing head applies a ninth layer of a ninth adhesive; and the tenth printing head applies a tenth layer of a tenth adhesive. From these nonlimiting examples it is clear to see how multiple heads from 1-10 or even more heads can be used.

In addition, the multiple heads may deliver the same composition or may deliver a unique composition. As a result, there are a number of different combinations possible. For example, different layers may be combined in different orders to provide a unique overall composition.

Another example includes a simple system having multiple print heads but using 7 print heads. The first printing head applies a first layer of a first indicator. The second printing head applies a second layer of a first adhesive. The third printing head applies the third layer of a first adhesive. The fourth printing head applies a fourth layer of a second adhesive. The fifth printing head applies a fifth layer of a second adhesive. The sixth printing head applies a sixth layer of a third adhesive. The seventh printing head applies a seventh layer of a third adhesive.

Another example includes a simple system having multiple print heads but using 3 print heads. The first printing head applies a first layer of a first adhesive. The second printing head applies a second layer of a second adhesive. The third printing head applies the third layer of a first adhesive.

Another example includes a simple system having multiple print heads. The first printing head applies a first layer of a first indicator. The second printing head applies a second layer of a first adhesive. The third printing head applies the third layer of a second indicator.

Another example includes a simple system having multiple print heads but using 10 print heads. The first printing head applies a first layer of a first adhesive. The second printing head applies a second layer of a second adhesive. The third printing head applies the third layer of a first adhesive. The fourth printing head applies a fourth layer of a second adhesive. The fifth printing head applies a fifth layer of a first adhesive. The sixth printing head applies a sixth layer of a second adhesive. The seventh printing head applies a seventh layer of a first adhesive. The eight printing head applies a eight layer of a second adhesive. The ninth printing head applies a ninth layer of a first adhesive. The tenth printing head applies a tenth layer of a second adhesive.

Another example includes a simple system having multiple print heads but using 10 print heads. The first printing head applies a first layer of a first adhesive. The second printing head applies a second layer of a second adhesive. The third printing head applies the third layer of a third adhesive. The fourth printing head applies a fourth layer of a first adhesive. The fifth printing head applies a fifth layer of a second adhesive. The sixth printing head applies a sixth layer of a third adhesive. The seventh printing head applies a seventh layer of a first adhesive. The eight printing head applies a eight layer of a second adhesive. The ninth printing head applies a ninth layer of a third adhesive.

Another example includes a simple system having multiple print heads but using 4 print heads. The first printing head applies a first layer of a first adhesive. The second printing head applies a second layer of a second adhesive. The third printing head applies the third layer of a first adhesive. The fourth printing head applies a fourth layer of a third adhesive.

Another example includes a simple system having multiple print heads but using 10 print heads. The first printing head applies a first layer of a first adhesive. The second printing head applies a second layer of a second adhesive. The third printing head applies the third layer of a first adhesive. The fourth printing head applies a fourth layer of a third adhesive. The fifth printing head applies a fifth layer of a first adhesive. The sixth printing head applies a sixth layer of a fourth adhesive. The seventh printing head applies a seventh layer of a first adhesive. The eight printing head applies a eight layer of a fifth adhesive. The ninth printing head applies a ninth layer of a first adhesive. The tenth printing head applies a tenth layer of a sixth adhesive. As it can be seen the combination can be modified to produce any final composition desired.

The first printing head applies a first layer of a first indicator. The second printing head applies a second layer of a first adhesive. The third printing head applies the third layer of a second adhesive. The fourth printing head applies a fourth layer of a first adhesive. The fifth printing head applies a fifth layer of a third adhesive. The sixth printing head applies a sixth layer of a fourth adhesive. The seventh printing head applies a seventh layer of a first adhesive.

Another example includes a simple system having multiple print heads. The first printing head applies a first layer of a first adhesive. The second printing head applies a second layer of a first adhesive. The third printing head applies the third layer of a second adhesive. The fourth printing head applies a fourth layer of a first adhesive. The fifth printing head applies a fifth layer of a third adhesive. The sixth printing head applies a sixth layer of a third adhesive. The seventh printing head applies a seventh layer of a second adhesive. The eight printing head applies a eight layer of a fourth adhesive. The ninth printing head applies a ninth layer of a second adhesive. The tenth printing head applies a tenth layer of a fifth adhesive.

Another example includes a simple system having multiple print heads that apply a composition to different regions or zones of the substrate. For example, a substrate may have multiple zones or regions, e.g., each side may have one or more zones. A substrate may have one zone on three sides of a periphery of one side of the substrate and a second zone on the fourth sides of a periphery of one side of the substrate to make 2 zones. A substrate may have one zone on each side of a periphery of one side of the substrate to make 4 zones. A substrate may have multiple zones on each side of a periphery of one side of the substrate to make 8 or more zones. A substrate may have one zone on each side of a periphery and one zone on each corner of one side of the substrate to make 8 zones. These are meant for illustrative examples and may be modified to include different zones and number of zones as well as different combinations of adhesives as listed above.

One type of known apparatus usable to seal a polymeric film lid onto the top rim of a container uses a heated platten.

If the tray is plastic, it can be made leak proof and airtight. If it is paperboard, it can be made leak resistant. The apparatus involves a fixed lower support serving as a tray carrier and having a well or cavity to receive and retain a container therein, and an upper heated platen pivotally mounted to shift to a closed position on the container and lid between the platen and the lower support. The heated platen is manually forced down and held down by the weight of the human operator onto the container and lid during a time period while heat is applied to seal the lid to the container. However, in order to provide sufficient force on the container and lid to fully compress the periphery of the two together, the heated upper platen must be manually forced down with a significant force which is usually about 20-40 pounds. By using leverage-type mechanical advantage, the force applied to the container and lid can be about 75 pounds. This exertion is required for each tray and lid, and for a set time period, in order to force the platen and tray carrier fully together. Moreover, it has been determined that even the application of this much force is sometimes not sufficient to assure a complete seal of the lid periphery to the container periphery. To be certain of sealing, the force should actually be several times this amount. One of the variables that can prevent total sealing is a non-uniform thickness of the flange of the tray about its periphery, thereby resulting in a poor seal at the thinner areas.

The present invention provides pressure-sensitive adhesives including tackified natural rubbers; synthetic rubbers such as butyl rubber; and tackified linear, radial, star, and branched and tapered styrene block copolymers, such as styrene-butadiene, styrene-ethylene/butylene and styrene-isoprene; polyurethanes; polyvinyl ethers; acrylics, especially those having long chain alkyl groups; poly-α-olefins; and silicones. For example, acrylonitrile butadiene, polyamide, polybutadiene, ethylene vinyl acetate, polypropylene, polybutylene, acrylic, natural rubber, neoprene, polycholoroprene, polyester, polyester emulsion, polyisoprene, polypropylene emulsion, polyurethane, polyvinyl acetate, polyvinyl alcohol, polyvinyl butyral, polyvinyl chloride, polyvinylidene chloride, silicone emulsion, styrene isoprene, styrene acronitrile, styrene acrylic, styrene butadiene, vinyl acetate, vinyl acetate-ethylene, vinyl alcohol, wax emulsion.

In one embodiment the pressure-sensitive adhesive is used on sheets in the form of a coherent nonwoven web of fibers that has a four-fold balance of adhesion, cohesion, stretchiness, and elasticity. The fibers typically have a diameter of no greater than about 100 microns and are coherent fibers that can include one material or a mixture of materials in one layer, or multiple materials in multiple layers.

The present invention provides polymers which may or may not be inherently tacky. In the polymeric mixtures (e.g., polymeric blends), the different polymers may or may not be compatible with each other, as long as the overall mixture is compatible.

In one embodiment the polymers or copolymers of the present invention include, but are not limited to, acrylates; polyolefins such as polyethylene, polypropylene, polybutylene, polyhexene, polyoctene; polystyrenes; polyurethanes; polyesters such as polyethyleneterephthalate; polyamides such as nylon; natural or synthetic rubber resins such as styrenic block copolymers (e.g., styrene/isoprene/styrene, styrene/butadiene/styrene); epoxies;

vinyl acetates such as ethylene vinyl acetate; polydiorganosiloxane polyurea copolymers; copolymers thereof and mixtures thereof. These polymers may or may not have pressure-sensitive adhesive properties, as long as the overall resultant has pressure-sensitive adhesive properties.

Preferably, the composition of the present invention includes, but is not limited to acrylonitrile butadiene, polyamide, polybutadiene, ethylene vinyl acetate, polypropylene, polybutylene, acrylic, natural rubber, neoprene, polycholoroprene, polyester, polyester emulsion, polyisoprene, polypropylene emulsion, polyurethane, polyvinyl acetate, polyvinyl alcohol, polyvinyl butyral, polyvinyl chloride, polyvinylidene chloride, silicone emulsion, styrene isoprene, styrene acronitrile, styrene acrylic, styrene butadiene, vinyl acetate, vinyl acetate-ethylene, copolymers thereof and mixtures thereof.

Suitable rubber resin adhesives include those formed using a tackified elastomer where a preferred elastomer is an A-B type block copolymer wherein the A and B blocks are configured in linear (e.g., a diblock or triblock copolymer), radial or star configurations. The A block is formed of a mono-alkenylarene, (e.g., a polystyrene block having a molecular weight between 4000 and 50,000). Other suitable A blocks may be formed from alpha-methylstyrene, t-butylstyrene and other ring alkylated styrenes, as well as mixtures thereof. The B block is formed of an elastomeric conjugated diene, polyisoprene, polybutadiene or copolymers (e.g., having an average molecular weight from about 5000 to about 500,000). The A block content is about 10 to 50 weight percent of the block copolymer and the B block content is about 90 to 50 percent. The tackifying components for the elastomer based adhesives generally comprise solid tackifying resin and/or a liquid tackifier or plasticizer, e.g., napthenic oils, paraffin oils, aromatic oils, mineral oils or low molecular weight rosin esters, polyterpenes and C5 resins, resin esters, polyterpenes and the like.

Suitable polyolefin adhesives include tackified polyolefin elastomer adhesives, or amophous poly(alpha-olefin) polymers suitable for forming hot melt pressure-sensitive adhesives with or without added tackifier. Such amorphous poly(alpha-olefin) polymers are generally copolymers of C3 to C5 linear alpha-olefin(s) and a higher alpha-olefin(s) (generally C6 to C10). Preferred are copolymers of polyolefins with polyhexene, polyheptene, polyoctene, polynonene, and/or polydecene. Such amorphous poly(alpha-olefins).

Suitable acrylate copolymer pressure-sensitive adhesives include poly(acrylates) derived from: (A) at least one monofunctional alkyl (meth)acrylate monomer (i.e., allyl acrylate and alkyl methacrylate monomer); and (B) at least one monofunctional free-radically copolymerizable reinforcing monomer.

The monomers used in preparing the pressure-sensitive adhesive copolymer fibers of the present invention include: (A) a monofunctional alkyl (meth)acrylate monomer and (B) a monofunctional free-radically copolymerizable reinforcing monomer. Monomer A, which is a monofunctional alkyl acrylate or methacrylate (i.e., (meth)acrylic acid ester), contributes to the flexibility and tack of the copolymer. The alkyl group can optionally contain oxygen atoms in the chain thereby forming ethers or alkoxy ethers. Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, poly-ethoxylated or -propoxylated methoxy (meth)acrylate (i.e., poly(ethylene/propylene oxide) mono(meth)acrylate) macromers (i.e., macromolecular monomers), polymethylvinyl ether mono(meth)acrylate macromers, and ethoxylated or propoxylated nonylphenol acrylate macromers. Monomer B, which is a monofunctional free-radically copolymerizable reinforcing monomer; increases the glass transition temperature of the copolymer. As used herein, "reinforcing" monomers are those that increase the modulus of the adhesive, and thereby its strength. Examples of monomer B include, but are not limited to, acrylamides, such as acrylamide, methacrylamide, N-methyl acrylamide, N-ethyl acrylamide, N-methylol acrylamide, N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dimethylol acrylamide, N,N-dihydroxyethyl acrylamide, t-butyl acrylamide, dimethylaminoethyl acrylamide, N-octyl acrylamide, and 1,1,3,3-tetramethylbutyl acrylamide. Other examples of monomer B include acrylic acid and methacrylic acid, itaconic acid, crotonic acid, maleic acid, fumaric acid, 2,2-(diethoxy)ethyl acrylate, hydroxyethyl acrylate or methacrylate, 2-hydroxypropyl acrylate or methacrylate, methyl methacrylate, isobutyl acrylate, n-butyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl pyrrolidone, and N-vinyl caprolactam.

A crosslinking agent can be used if so desired to build the molecular weight and the strength of the copolymer, and hence improve the integrity and shape. The crosslinking agent may produce chemical crosslinks (e.g., covalent bonds). The crosslinking agent may be an acrylic crosslinking monomer, or a polymeric crosslinking material having a copolymerizable vinyl group. The acrylic crosslinking monomer is preferably one that is copolymerized with monomers A and B and generates free radicals in the polymer backbone upon irradiation of the polymer.

The adhesive compositions of the present invention may contain, optional additives including tackifiers, fillers, plasticizers, and other property modifiers, such as flow modifiers, dyes, pigments, flame retardants, stabilizers, antioxidants, compatibilizers, antimicrobial agents, and other additives are not necessary. These additives are incorporated in amounts that do not materially adversely affect the desired properties of the pressure-sensitive adhesives.

The present invention also includes natural rubber pressure-sensitive adhesives generally contain masticated natural rubber and include tackifying resins.

The present invention also includes styrene block copolymer pressure-sensitive adhesives generally include elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure-sensitive adhesives include linear, radial, star and tapered styrene-isoprene block copolymers; linear styrene-(ethylene-butylene) block copolymers; linear styrene-(ethylene-propylene) block copolymers; and linear, radial, and star styrene-butadiene block copolymers. Thermoplastic phase associating resins include polyaromatics; coumarone-indene; and other high-solubility parameter resins derived from coal tar or petroleum.

The present invention includes polyvinyl ether pressure-sensitive adhesives are generally blends of homopolymers of vinyl methyl ether, vinyl ethyl ether or vinyl iso-butyl ether, or blends of homopolymers of vinyl ethers and copolymers of vinyl ethers and acrylates to achieve desired pressure-sensitive properties. Depending on the degree of polymerization, homopolymers may be viscous oils, tacky soft resins or rubber-like substances. Polyvinyl ethers used as raw materials in polyvinyl ether adhesives include polymers based on: vinyl methyl ether; vinyl ethyl ether; vinyl isobutyl ether; methacrylate/vinyl isobutyl ether/acrylic acid. Antioxidants tackifiers, plasticizers and pigments useful to stabilize the polyvinylether pressure-sensitive adhesive may also be used.

The present invention includes acrylic pressure-sensitive adhesives and may comprise from 100 to 80 weight percent of a C3-C12 alkyl ester component such as, for example, isooctyl acrylate, 2-ethyl-hexyl acrylate and n-butyl acrylate and from 0 to 20 weight percent of a polar component such as, for example, acrylic acid, methacrylic acid, ethylene vinyl acetate, N-vinyl pyrrolidone and styrene macromer. Preferably, the acrylic pressure-sensitive adhesives comprise from 0 to 20 weight percent of acrylic acid and from 100 to 80 weight percent of isooctyl acrylate.

The present invention includes silicone pressure-sensitive adhesives made of two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is end-capped with trimethylsiloxy groups (OSiMe3) and also contains some residual silanol functionality.

For example, the package assembly includes three layers, namely a base layer of TYVEK® (i.e., a breathable, nonwoven, spun bonded, polyolefin material); a adhesive layer, (e.g., a flexible heat sealable polymer, preferably translucent, and most preferably transparent, as of polyethylene); and a top layer having a three-dimensional preformed area of a heat sealable polymeric layer (e.g., ethylene-vinyl acetate, ethylene-vinyl acetate). The layers are joined together, preferably by a heat seal, a hot melt adhesive such as EVA which may be applied over the surface. Use of an adhesive assures excellent sealing between layers.

The present invention also provides a method of forming a novel package. Specifically, a continuous web or film feeds to a forming die which repeatedly thermoforms spaced three-dimensional areas in web to form pockets. Next the objects are shown placed in the respective pockets, after which a continuous film is applied over the web and the objects. Next the final layer is applied. The layers are sealed around the periphery of the blisters by a heat sealer, using a heat responsive adhesive. Finally, the individual packages are severed from the strip thereof by a cutting element. A delamination failure peel seal extends along substantially the full length line of permanent line heat seal. However, it is only required that the peel seal extends a distance along the line heat seal such that when the peel seal portion of the heat seal is fully peeled open, the contents of cavity are readily accessible. For example, it is often desirable to make permanent seals between webs A and B in the regions of line heat seal at the end of the pouch and adjacent to the access opening of the pouch. A permanent seal at this point will prevent undesirable premature peeling a part of webs A and B when an object is inserted into the pouch. A line heat seal defines the outer limits of a cavity for holding one or more items to be sterilized. The line heat seal does not, however, extend completely around the cavity as it is necessary to provide the pouch with an access opening to permit insertion into the cavity of an object to be sterilized. The heat seal is therefore omitted from at least one marginal region of the pouch to provide access between webs A and B into the cavity. In one embodiment, the line heat seal is also omitted in the region where the access opening is provided. Thus, in the pouch, the line heat seal is provided directly below the line heat seal, but line heat seals are both omitted from end of the pouch. After an object to be sterilized has been inserted into cavity, the package is sealed. This can be accomplished in any of several ways, such as by providing the package with an adhesive coating or tape or by heat sealing. If desired, the pouch can be provided with a conventional indicator means for showing that sterilization is complete. Suitable indicators include inks and tapes. When ready for use, the sterilized pouch package is simply opened manually by grasping the flange areas to open the delamination failure peel seal as described above. The two webs which surround cavity 16 have smooth plastic surfaces which, together with the reliable peeling open of the peel seal, virtually eliminate the generation of fiber fragments or dust.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A packaging method for a sealable container using a design control water based adhesive composition for application using a printing press comprising the steps of:
   providing a printing press having multiple heads;
   providing the multiple heads individually with at least a first composition and a second composition;
   providing a substrate comprising a first side and a second side each having a top edge, a bottom edge, a right edge, a left edge and a storage region positioned there between;
   applying the first composition from the printing press to the top edge, the bottom edge, the right edge, the left edge;
   applying at least the second composition from the printing press to the first composition; and
   placing a cover on the at least a second composition to be sealed by the second composition and the first composition.

2. The method of claim 1, further comprising the step of sterilizing the substrate.

3. The method of claim 1, further comprising the step of adding an integral sterilization indicator.

4. The method of claim 1, wherein the second composition and the first composition independently comprise a polymer or copolymer selected from the group consisting of: a design control water based adhesive composition comprising one or more selected from acrylonitrile butadiene, polyamide, polybutadiene, ethylene vinyl acetate, polypropylene, polybutylene, acrylic, natural rubber, neoprene, polycholoroprene, polyester, polyester emulsion, polyisoprene, polypropylene emulsion, polyurethane, polyvinyl acetate, polyvinyl alcohol, polyvinyl butyral, polyvinyl chloride, polyvinylidene chloride, silicone emulsion, styrene isoprene, styrene acronitrile, styrene acrylic, styrene butadiene, vinyl acetate, vinyl acetate-ethylene, vinyl alcohol, and wax emulsion.

* * * * *